United States Patent
Parker

(10) Patent No.: US 9,980,495 B2
(45) Date of Patent: May 29, 2018

(54) SUPPORT DEVICE

(71) Applicant: Shane Parker, Leesville, LA (US)

(72) Inventor: Shane Parker, Leesville, LA (US)

( * ) Notice: Subject to any disclaimer, the term of this patent is extended or adjusted under 35 U.S.C. 154(b) by 0 days. days.

(21) Appl. No.: 14/879,229

(22) Filed: Oct. 9, 2015

(65) Prior Publication Data
US 2016/0165904 A1 Jun. 16, 2016

Related U.S. Application Data

(60) Provisional application No. 62/092,309, filed on Dec. 16, 2014.

(51) Int. Cl.
*A22B 5/00* (2006.01)
*A22B 5/06* (2006.01)

(52) U.S. Cl.
CPC .................................... *A22B 5/06* (2013.01)

(58) Field of Classification Search
CPC ......... A22B 5/0047; A22B 5/16; A22B 5/161; A22B 5/20; A22B 5/00; A22B 5/0005; A22B 5/0017
USPC ......................................... 452/185, 187–192
See application file for complete search history.

(56) References Cited

U.S. PATENT DOCUMENTS

| | | | |
|---|---|---|---|
| 5,049,110 A * | 9/1991 | Owens | A22B 5/06 182/133 |
| 5,562,534 A | 10/1996 | McGough | |
| 6,739,964 B2 * | 5/2004 | Gearhart | A22B 5/06 452/187 |
| 7,341,507 B1 * | 3/2008 | Julian, Sr. | A22B 5/06 452/192 |
| 7,476,149 B2 * | 1/2009 | Burrows | A22B 5/06 452/187 |
| 7,544,120 B1 * | 6/2009 | Tardif | A01M 31/006 452/187 |
| 7,913,980 B1 * | 3/2011 | Cipriano | B66D 3/08 248/218.4 |
| 8,915,774 B1 * | 12/2014 | Hunter | A22B 5/06 452/187 |
| 2008/0085669 A1 | 4/2008 | Burrows | |
| 2011/0260127 A1 | 10/2011 | Surgeon et al. | |

* cited by examiner

*Primary Examiner* — Richard T Price, Jr.
(74) *Attorney, Agent, or Firm* — Global Intellectual Property Agency, LLC; Jordan Sworen

(57) ABSTRACT

A support device securable to a tree or other similar support for use in suspending game animals therefrom. The support device includes a clamp that can be removably affixed to a tree trunk or similar support, wherein the clamp includes one or more sets of teeth to engage with the tree trunk. An elongated arm having a first end and a second end is attached to the clamp at a first end thereof and extends outward from the clamp. The second end of the elongated arm includes a loop thereon that can be used to suspend a game animal, such as a deer, for cleaning. The support device can be affixed to trees of various shapes or sizes and can be positioned at a desired height on the tree.

6 Claims, 2 Drawing Sheets

SUPPORT DEVICE

CROSS REFERENCE TO RELATED APPLICATION

This application claims the benefit of U.S. Provisional Application No. 62/092,309 filed on Dec. 16, 2014. The above identified patent application is herein incorporated by reference in its entirety to provide continuity of disclosure.

BACKGROUND OF THE INVENTION

Field of the Invention

The present invention relates to support devices. More specifically, the present invention provides a support device that is securable to a tree and that can be used to suspend a game animal for cleaning. The support device comprises a clamp removably affixable to a tree, wherein an elongated arm extends outward from the clamp and includes a loop thereon that can be used to secure a game animal to the support device.

Hunters often clean game animals while out in the woods after they have finished hunting. In order to clean a large game animal, such as a deer, it is necessary to suspend the deer in a vertical orientation from an overhead support. In this way, the hunter has access to all portions of the deer and is not required to lift or move the deer during the cleaning process.

Typically, hunters suspend game animals from a tree branch in order to clean the animal. However, tree branches may be unstable and the tree branch may not be able to support the weight of the animal. If the tree branch breaks, the hunter may be injured, the game animal may be damaged, and there will be delay and additional difficulty in cleaning the animal. Others may use support devices securable to the rear of a pickup truck or other vehicle, however, the hunter may be unable to transport the animal back to the vehicle, such as when the hunter is in thick wooded areas, or mountainous regions. Thus, a support device that can be easily transported to a desired location and fixed to any of various trees is desired.

Devices have been disclosed in the prior art that relate to tree mounted hoists and hangers. These include devices that have been patented and published in patent application publications. These devices generally relate to devices for suspending deer and other game animals, such as U.S. Published Patent Application Number 2011/0260127, U.S. Pat. Nos. 7,544,120, 5,562,534, and 6,739,964, and U.S. Published Patent Application Number 2008/0085669.

These prior art devices have several known drawbacks. The devices in the prior art provides means for suspending an animal, but fail to provide a clamp removably securable to a tree. Such devices require other supports or fasteners to secure the device to a tree, which can be inconvenient for the user. Thus, a device that allows a user to suspend a game animal from any of various trees without the use of additional fasteners is desired.

In light of the devices disclosed in the prior art, it is submitted that the present invention substantially diverges in design elements from the prior art and consequently it is clear that there is a need in the art for an improvement to existing support devices. In this regard the instant invention substantially fulfills these needs.

SUMMARY OF THE INVENTION

In view of the foregoing disadvantages inherent in the known types of support devices now present in the prior art, the present invention provides a new support device wherein the same can be utilized for providing convenience for the user when suspending a game animal for cleaning.

It is therefore an object of the present invention to provide a new and improved support device that can be removably secured to a tree in order to suspend a game animal in an upright position for cleaning.

It is another object of the present invention to provide a support device comprising a clamp having an elongated arm with a loop on an end thereof, wherein an animal can be secured to the loop.

Another object of the present invention is to provide a support device having a clamp with one or more sets of teeth thereon that can be engaged with a tree or similar support in order to secure the clamp to the tree or support.

Yet another object of the present invention is to provide a support device that can be easily transported to various locations as required by the user.

Another object of the present invention is to provide a support device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
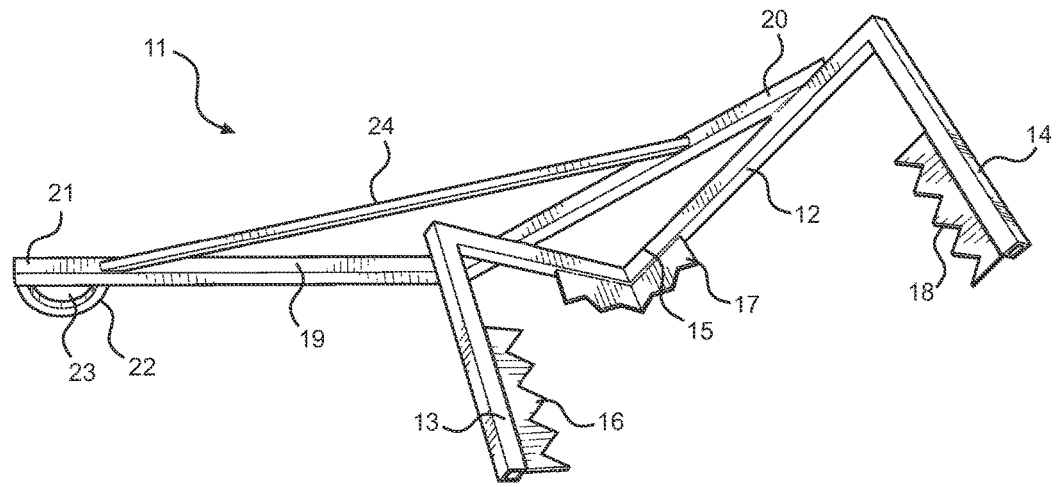
FIG. 1 shows a perspective view of the support device.

Reference is made herein to the attached drawings. Like reference numerals are used throughout the drawings to depict like or similar elements of the support device. For the purposes of presenting a brief and clear description of the present invention, the preferred embodiment will be discussed as used for suspending an animal therefrom. The figures are intended for representative purposes only and should not be considered to be limiting in any respect.

Figure 2:
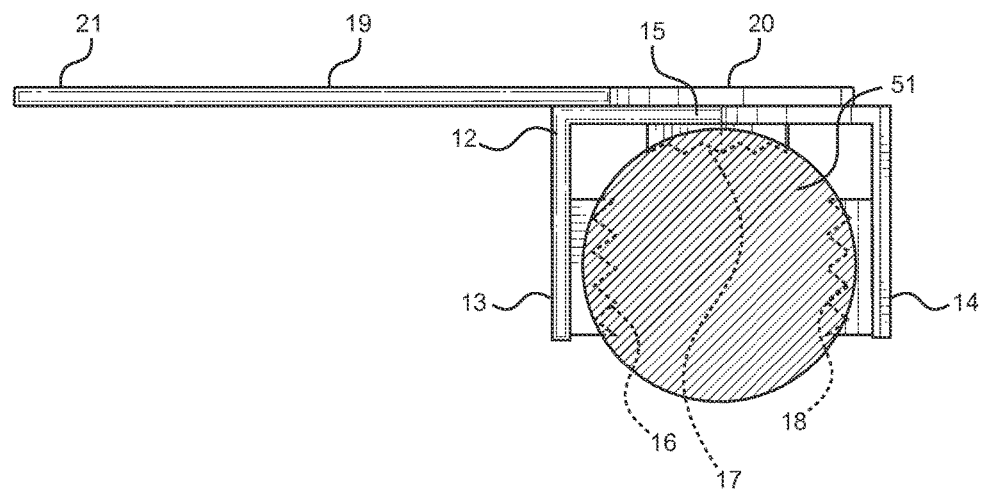
FIG. 2 shows a top-down cross sectional view of the support device as secured to a tree.

Referring now to FIGS. 1 and 2, there is shown a perspective view of the support device and a top-down cross sectional view thereof, respectively. The support device 11 comprises a clamp 12 adapted to be removably secured to a tree or similar support. The clamp 12 is shown as having an L-shaped configuration with outwardly extending end portions 13, 14. The end portions 13, 14 are substantially parallel to one another and are adapted to be positioned on opposing sides of a tree trunk. The clamp 12 having an L-shaped configuration is adapted to be positioned on a tree such that a first end portion 13 is disposed on a lower portion of the tree trunk 51, and the second end portion 14 is positioned at a relatively higher portion of the tree trunk 51. This arrangement allows the clamp 12 to be securely position on the tree trunk 51 and provides greater leverage when an animal is supported thereon so that the clamp 12 does not fall down or shift position on the tree. Thus, the clamp 12 is configured so as to improve stability and ensure securement of the clamp 12 to the tree.

The clamp 12 further comprises one or more sets of teeth thereon, wherein the teeth are adapted to engage with the tree trunk 51 in order to facilitate securement of the clamp 12 to the tree trunk 51. The teeth extend inwardly from the clamp 12 so as to engage with a tree trunk 51. In the illustrated embodiment, a first set of teeth 16 is positioned on the first end 13 portion. A second set of teeth 17 is positioned on bend 15 of the clamp 12. Finally, a third set of teeth 18 is positioned on the second end 14 portion of the clamp 12. The teeth engage various portions of the tree trunk 51 in order to secure the clamp 12 to the tree. The teeth are preferably tilted at a downward angle in order to more securely engage the tree trunk 51. The weight of the animal suspended on the support device 11 causes the teeth to be driven further into the tree, providing greater securement of the clamp 12 to the tree.

An elongated arm 19 having a first end 20 and a second end 21 is affixed to the clamp 12. The first end 20 of the elongated arm 19 is permanently affixed to the clamp 12. The elongated arm 19 is adapted to extend outwardly from a tree at a substantially horizontal orientation when the clamp 12 is affixed to a tree. The elongated arm 19 is preferably rigid in construction. The elongated arm 19 is permanently secured to the clamp 12 one or more points thereon. The elongated arm 19 may have an arcuate configuration so that the arm 19 contacts the clamp 12 at one or more positions while also retaining a horizontal configuration when said clamp 12 is secured to a tree. Further, in some embodiments, the arm 19 comprises a support bar 24 that extends between opposing ends of the arm 19 so as to help support and stabilize the arm 19 so that it does not bend or deform due to the weight of an animal supported thereon. The second end 21 of the elongated arm 19 comprises a loop or ring 22 thereon defining an open central area 23. The loop 22 is used to secure a game animal thereto via ropes or cables secured to the animal.

Figure 3:
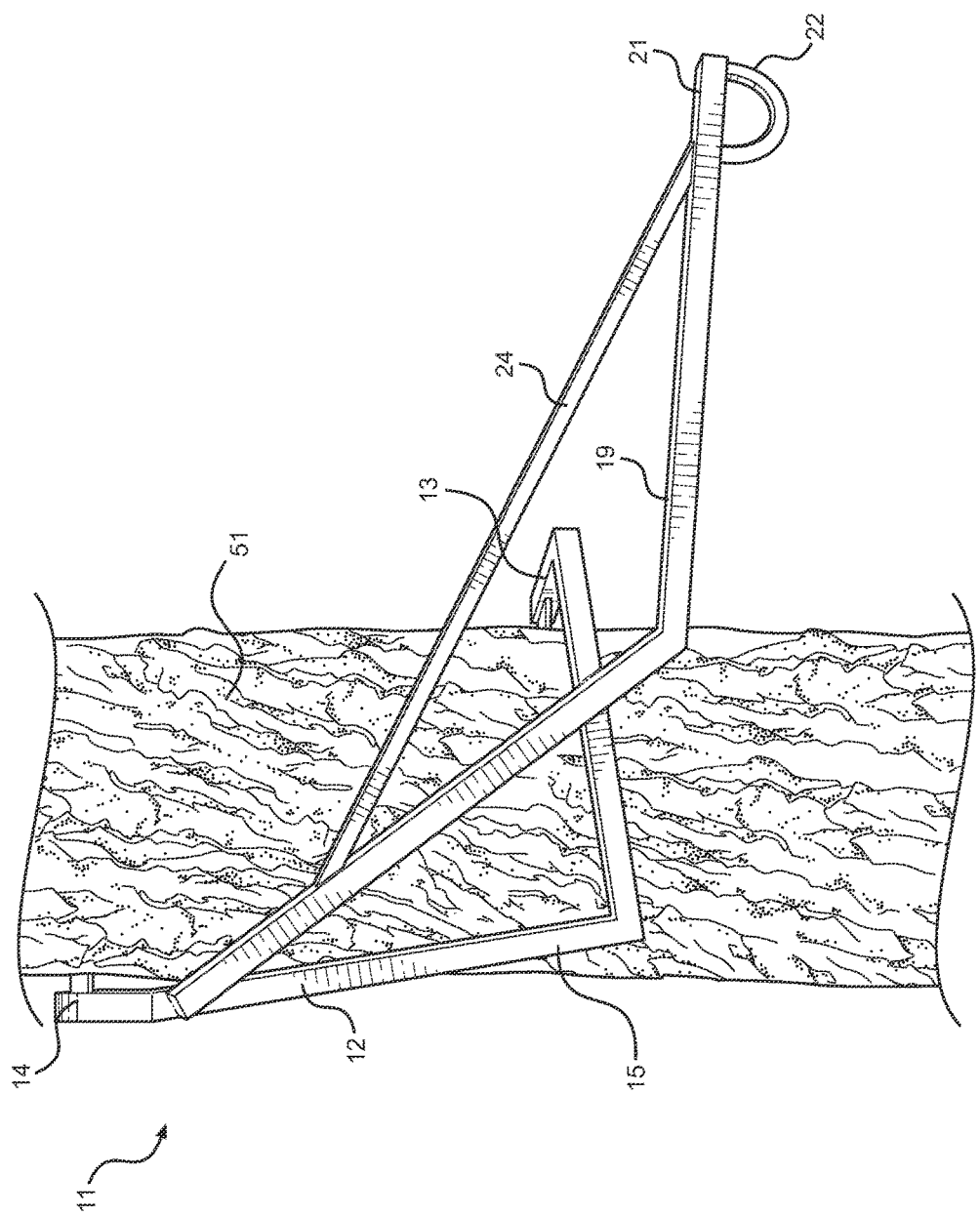
FIG. 3 shows a perspective view of the support device as secured to a tree.

Referring now to FIG. 3, there is shown a perspective view of the support device as secured to a tree. In operation, the clamp 12 is removably affixed to a tree trunk 51 at a desired height. The clamp 12 is positioned around the tree trunk 51 so as to partially surround the tree trunk 51. The first end 13 and second end 14 of the clamp 12 are on opposing sides of the tree trunk 51. One or more sets of teeth on the clamp 12 engage with the tree trunk 51 so as to secure the clamp 12 to the tree trunk 51. In this way, the clamp 12 can be removably and securely affixed to the tree trunk 51 in a desired position.

The elongated arm 19 extends outwardly from the clamp 12 and is preferably oriented in a substantially horizontal orientation. The second end 21 of the elongated arm comprises a loop 22 thereon. The user can affix an animal directly to the loop 22, or can secure a cable or rope tied to an animal to the loop 22 so as to position the animal in an upright or vertical orientation. The clamp 12 is secured to the tree and is able to support the weight of the game animal suspended from the elongated arm 19. Thus, the support device 11 can be affixed to any of various trees or other similar supports.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A support device, comprising:
a clamp removably securable to a tree;
the clamp including a first bracket base portion connected to a second bracket base portion at an angle forming a V-shape, wherein a pair of bracket arms extends perpendicular from each distal end of the first bracket base portion and the second bracket base portion respectively;
one or more sets of teeth disposed on one or more interior sides of the clamp, wherein at least one of the one or more sets of teeth is configured to engage with the tree at a downward angle relative to a horizontal plane parallel a ground surface in an engaged position;
an elongated arm having a first end and a second end, wherein said first end of said elongated arm is affixed to the first bracket base portion of the clamp, wherein the elongated arm extends along a vertical plane parallel the base portions;
the elongated arm configured for cantilevered support of an animal removably suspended from the second end therefrom.
2. The support device of claim 1, wherein said clamp and said elongated arm are composed of a rigid material.
3. The support device of claim 1, wherein the one or more sets of teeth are disposed on three interior sides of the clamp, the three interior sides being at a midpoint of the clamp and at each of the distal ends of the first bracket base portion and the second bracket base portion.
4. The support device of claim 3, wherein the animal removably suspended from the second end the elongated arm causes the one or more sets of teeth disposed at the distal ends of the first bracket base portion to be forced into the tree in the engaged position.
5. The support device of claim 1, wherein a support bar extends between the first end and the second end of the elongated arm.
6. The support device of claim 1, wherein the elongated arm is only affixed to the first bracket base portion and extends across the midpoint of the clamp, terminating at a distance past the distal end of the second bracket base portion.

* * * * *